(12) United States Patent
Robe

(10) Patent No.: US 10,526,193 B2
(45) Date of Patent: Jan. 7, 2020

(54) EQUIPMENT COMPRISING AN INSERTABLE COAXIAL VALVE FOR TRANSFERRING A FLUID INTO A RESERVOIR, AND METHOD

(71) Applicant: FIVES FILLING & SEALING, Le Bignon (FR)

(72) Inventor: Eric Robe, Le Bignon (FR)

(73) Assignee: FIVES FILLING & SEALING, Le Bignon (FR)

( * ) Notice: Subject to any disclaimer, the term of this patent is extended or adjusted under 35 U.S.C. 154(b) by 70 days.

(21) Appl. No.: 16/064,355

(22) PCT Filed: Dec. 21, 2016

(86) PCT No.: PCT/EP2016/082253
§ 371 (c)(1),
(2) Date: Jun. 20, 2018

(87) PCT Pub. No.: WO2017/109001
PCT Pub. Date: Jun. 29, 2017

(65) Prior Publication Data
US 2019/0002268 A1    Jan. 3, 2019

(30) Foreign Application Priority Data
Dec. 21, 2015 (FR) .................... 15 62983

(51) Int. Cl.
*B67D 7/42* (2010.01)
*B67D 7/02* (2010.01)
(Continued)

(52) U.S. Cl.
CPC ............ *B67D 7/0294* (2013.01); *B67D 7/02* (2013.01); *B67D 7/42* (2013.01); *F16K 1/123* (2013.01);
(Continued)

(58) Field of Classification Search
CPC .......... B67D 7/0294; B67D 7/42; B67D 7/02; F16K 1/123; F16K 1/38; F16K 1/12;
(Continued)

(56) References Cited

U.S. PATENT DOCUMENTS

| | | | |
|---|---|---|---|
| 6,848,670 B2 | 2/2005 | Haunhorst et al. | |
| 2013/0037739 A1* | 2/2013 | Millard | B67D 7/42 251/337 |
| 2017/0137279 A1 | 5/2017 | Achatz et al. | |

FOREIGN PATENT DOCUMENTS

| | | |
|---|---|---|
| EP | 1 271 073 A2 | 1/2003 |
| WO | 2015/149739 A1 | 10/2015 |
| WO | WO-2015149739 A1 * | 10/2015 |

OTHER PUBLICATIONS

International Search Report, dated Apr. 7, 2017, from corresponding PCT application No. PCT/EP2016/082253.

* cited by examiner

*Primary Examiner* — Marina A Tietjen
*Assistant Examiner* — Stephanie A Shrieves
(74) *Attorney, Agent, or Firm* — Young & Thompson

(57) ABSTRACT

Equipment for fluid transfer includes a valve, a frame that defines a housing for the valve and an upstream passage for the fluid that leads into the housing and is fluidically connectable to a fluid source, the valve being able to move between a non-inserted position and an inserted position in which the valve is situated at least partially in the housing, a module that defines a downstream passage for the fluid that fluidically connectable to the reservoir, the module being able to move between an open position, allowing the insertion of the valve, and a closed position in which the module is fixed to the frame, and two seals that are respectively compressed substantially between the valve and the frame (Continued)

Figure 1:
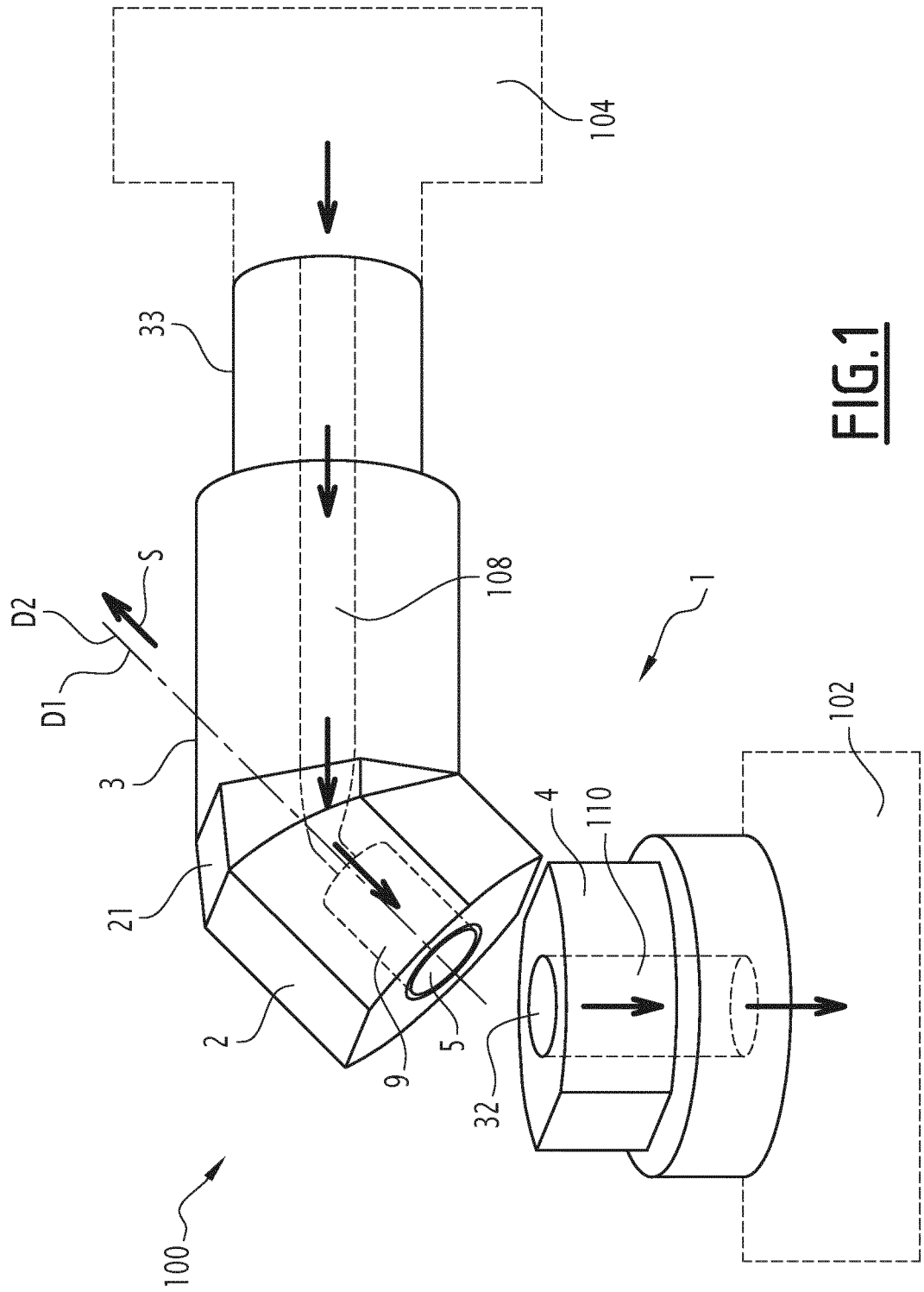

and between the valve and the module when the valve is in the inserted position and the module is in the closed position.

13 Claims, 2 Drawing Sheets

(51) Int. Cl.
*F16K 1/12* (2006.01)
*F16K 1/38* (2006.01)
*F16K 1/46* (2006.01)
*F16K 27/02* (2006.01)

(52) U.S. Cl.
CPC ............... *F16K 1/126* (2013.01); *F16K 1/38* (2013.01); *F16K 1/46* (2013.01); *F16K 27/0254* (2013.01)

(58) Field of Classification Search
CPC . F16K 1/126; F16L 37/32; F16L 37/30; F16L 37/40; F16L 37/44; F16L 29/02; F16L 29/04; B63B 27/34; B64F 1/28; B65D 25/465
USPC .......................... 141/311, 346–349, 382–384
See application file for complete search history.

EQUIPMENT COMPRISING AN INSERTABLE COAXIAL VALVE FOR TRANSFERRING A FLUID INTO A RESERVOIR, AND METHOD

BACKGROUND OF THE INVENTION

The present invention relates to equipment and a method that are intended to transfer one or several fluids from a filling unit to a reservoir or a downstream pipe. It is in particular applicable for transferring fluids such as cooling, air-conditioning or brake fluid,to the corresponding fluid circuit of a vehicle, for example on an automobile assembly line, or in the energy sector for filling electric radiators with fluid.

DESCRIPTION OF RELATED ART

The liquids used in the automotive sector are for the most part regulated due to their harmfulness for the environment or for the operators responsible for filling. Additionally, these liquids may also be dirty or cause clogging. During filling actions for fluid circuits, it is therefore important for the filling equipment to be designed to manage the opening and closing of fluid connections effectively guaranteeing the cleanliness of the filling operations as well as operator safety. To that end, the filling equipment is provided with attachment modules fastened on the reservoirs to be filled, and valves making it possible to block or open the fluid connections at the operator's request.

These valves are controlled by hydraulic systems or pneumatic systems, or by electrical systems. In the field of fluid filling, the dimensions and weight are significant components in choosing the filling device. Reducing them makes it possible to improve the ergonomics and facilitate handling of the adapter by the operator.

One solution is to use coaxial valves to reduce the size of the filling device. The valves are housed in a removable chassis suitable for different valve diameters. The valves are inserted into the chassis by pushing them. The chassis is next fastened by one of its faces, to the adapter, and on an opposite face, to an attaching module on the reservoir.

The removal of the valves is fairly tedious, since it is necessary to disassemble the chassis to have access to it. It is next necessary to remove the valves from their housing by pulling out with specific tools, due to the friction caused by the presence of sealing gaskets on the side wall of the valves.

In many configurations, the coaxial valves are assembled directly in the chassis, which may cause small parts to be lost during the disassembly or pulling out of said valves. These assembly and disassembly operations are fairly frequent and are time-consuming for operators, and the potential losses of small parts reduce the productivity of the assembly chains.

One aim of the invention is therefore to offset these problems. It more particularly aims to simplify the removal of the valves from the chassis to guarantee replacement by the operator, while maintaining the functionalities and performance of the filling equipment.

BRIEF SUMMARY OF THE INVENTION

To that end, the invention relates to equipment for transferring fluid into a reservoir or a downstream pipe, the equipment comprising:
at least one coaxial valve defining a central passage for the fluid in an axial direction, the valve having a body,
a chassis defining, on the one hand, at least one housing for receiving the valve, and, on the other hand, an upstream passage for the fluid, the upstream passage emerging in the housing and being intended to be fluidly connected to a fluid source, the valve being movable relative to the chassis, preferably in translation, in an insertion direction between a non-inserted position in which the valve is located outside the housing, and an inserted position in which the valve is located at least partially in the housing,
a module defining a downstream passage for the fluid, the downstream passage being intended to be fluidly connected to the reservoir or downstream pipe, the module being movable relative to the chassis between an open position, allowing the insertion of the valve in the housing, and a closed position in which the module is fastened on the chassis, and
at least two sealing gaskets respectively forming drawstrings closed around the axial direction and being respectively compressed substantially in the insertion direction between the valve and the chassis, and between the valve and the module when the valve is in the inserted position and the module is in the closed position.

According to specific embodiments, the equipment comprises one or more of the following features, considered alone or according to all technically possible combinations:
the valve has a seal axially movable relative to the body, and a pneumatic or hydraulic control system for the seal, the system including a supply orifice defined by the body or by a cover of the valve, and the equipment comprises at least one additional sealing gasket separate from said two sealing gaskets, the additional sealing gasket forming a drawstring closed around the axial direction and being compressed substantially in the insertion direction either between the valve and the chassis, or between the valve and the module, when the valve is in the inserted position and the module is in the closed position, the additional sealing gasket and one of the two sealing gaskets being suitable for providing sealed contact of the supply orifice with the chassis or with the module, the sealed contact being intended to allow fluid to be taken into the system;
the valve comprises two opposite end surfaces in the insertion direction, and an outer lateral surface extending axially between the two end surfaces and substantially parallel to the insertion direction, the lateral end surface molding an inner surface of the chassis when the valve is in the inserted position, the inner surface preferably covering the entire lateral end surface, and the lateral end surface sliding freely on the inner surface in the insertion direction when the valve goes from the non-inserted position to the inserted position;
the two end surfaces are planar and preferably substantially perpendicular to the insertion direction;
the valve and the housing are substantially cylindrical;
the chassis comprises a removable part, one of the two sealing gaskets being compressed substantially in the insertion direction between the removable part and the valve when the valve is in the inserted position and the module is in the closed position; and
the axial direction and the insertion direction are substantially parallel to one another.

The invention also relates to an assembly comprising at least one reservoir or downstream pipe, at least one fluid source, and at least one piece of equipment as described above, the upstream passage formed by the chassis being fluidly connected to the fluid source, and the downstream passage formed by the module being fluidly connected to the reservoir or downstream pipe.

The invention also relates to a method for transferring a fluid into a reservoir or into a downstream pipe, comprising the following steps:
  providing a coaxial valve defining a central passage for the fluid in an axial direction, the valve having a body,
  providing a chassis defining, on the one hand, at least one housing for receiving at least the valve, and, on the other hand, an upstream passage for the fluid, the upstream passage emerging in the housing, the valve being movable relative to the chassis, preferably in translation, in an insertion direction between a non-inserted position in which the valve is located outside the housing, and an inserted position in which the valve is located at least partially in the housing,
  fluidly connecting the upstream passage to a fluid source,
  providing a module defining a downstream passage for the fluid, the module being movable relative to the chassis between an open position, allowing the insertion of the valve in the housing, and a closed position in which the module is fastened on the chassis,
  fluidly connecting the downstream passage to the reservoir or downstream pipe,
  providing at least two sealing gaskets respectively forming drawstrings closed around the axial direction, and
  mechanically compressing the two sealing gaskets substantially in the insertion direction respectively between the valve and the chassis and between the valve and the module, the valve being in the inserted position and the module being in the closed position.

BRIEF DESCRIPTION OF THE SEVERAL VIEWS OF THE DRAWING(S)

These features and advantages of the invention will appear upon reading the following description, provided solely as a non-limiting example, in reference to the appended drawings, in which:
  FIG. 1 is a schematic perspective illustration of an assembly according to the invention; and
  FIG. 2 is a partial axial sectional view of the filling equipment shown in FIG. 1.

DETAILED DESCRIPTION OF THE INVENTION

Figure 2:
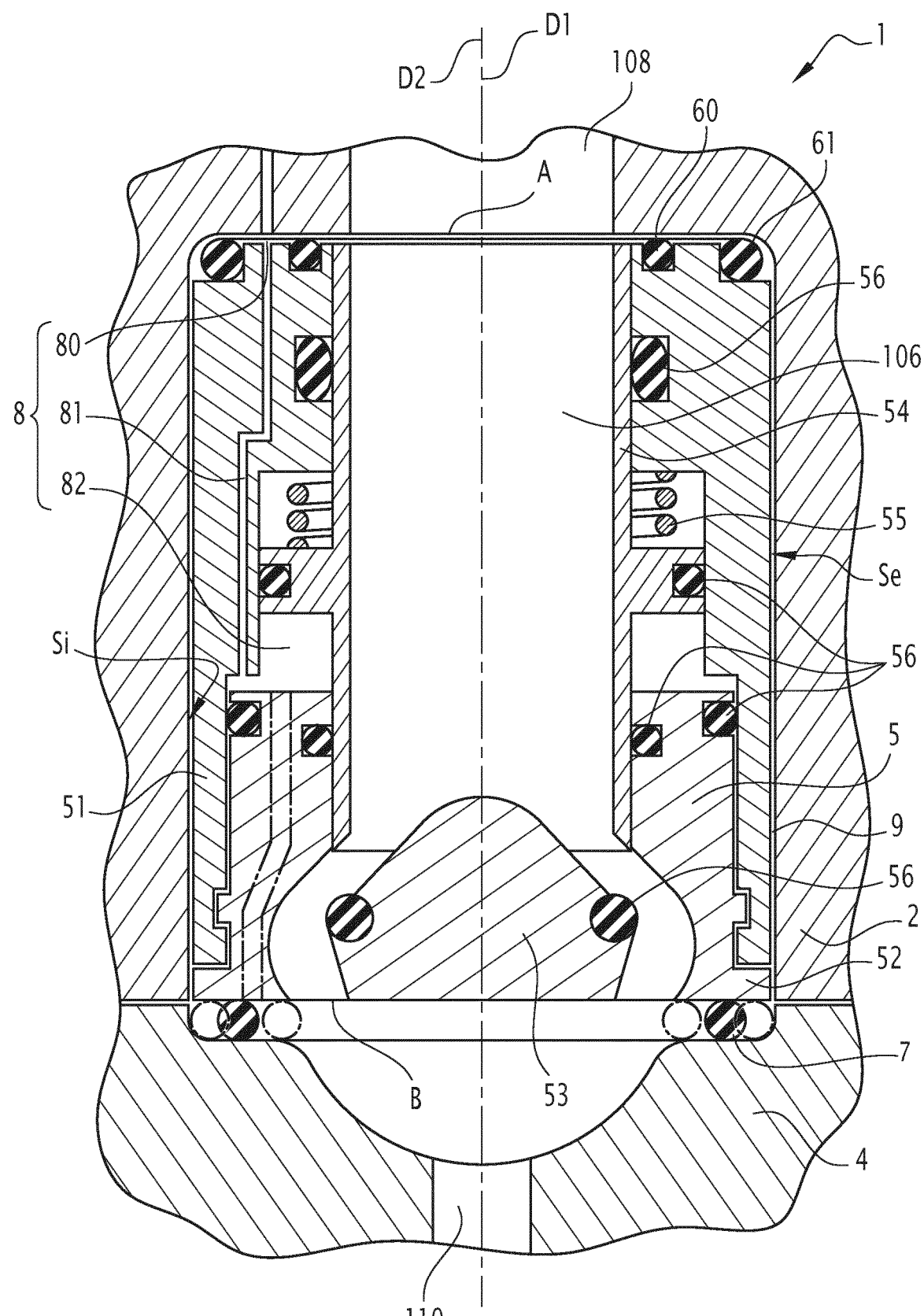

An assembly 100 according to the invention is described in reference to FIGS. 1 and 2.

The assembly 100 for example pertains to the automobile sector and advantageously belongs to an assembly line (not shown) for motor vehicles (not shown). The invention nevertheless applies to all sectors involving filling with fluids, in particular the energy sector for filling electric radiators with fluid.

The assembly 100 comprises a reservoir or downstream pipe 102, a fluid source 104, and a piece of equipment 1 for transferring fluid into the reservoir from the fluid source.

In the alternative where the element 102 is a downstream pipe, the latter conveys the fluid for example to a reservoir to be filled.

The fluid is for example coolant, air-conditioning fluid or brake fluid.

The reservoir or downstream pipe 102 is thus, in the illustrated example, a cooling liquid, air-conditioning liquid or brake liquid reservoir.

The fluid source 104 is a fluid dispensing unit, known in itself. Advantageously, the fluid source 104 is suitable for distributing several fluids from among those mentioned above.

If the element 102 is a reservoir, the equipment 1 is intended to allow at least partial filling of this reservoir 102. If the element 102 is a downstream pipe, the equipment 1 is intended to transfer at least part of the fluid to this downstream pipe.

The equipment 1 comprises a coaxial valve 5 defining a central passage 106 for the fluid in an axial direction D1, a chassis 2 defining, on the one hand, at least one housing 9 for receiving the valve 5 in an insertion direction D2, and on the other hand, an upstream passage 108 for the fluid. The equipment 1 also comprises a module 4 defining a downstream passage 110 for the fluid, two sealing gaskets 7, 60, and an additional sealing gasket 61 separate from the two sealing gaskets 7, 60.

According to one particular embodiment (not shown), the equipment 1 comprises several valves similar to the valve 5 that are received in several housings defined by the chassis 2.

The valve 5 is movable relative to the chassis 2, for example in translation, in the insertion direction D2 between a non-inserted position and an inserted position shown in FIGS. 1 and 2, in which the valve 5 is located in the housing 9. In the non-inserted position (not shown), the valve 5 is located outside the housing 9. The non-inserted position is deduced from the inserted position shown in FIG. 1 by a translation of the valve relative to the chassis 2 in the insertion direction D2. The valve 5 is inserted in the direction shown by an arrow S in FIG. 1, and rises from the housing 9 in the direction opposite the arrow S, like a cartridge.

The valve 5 (FIG. 2) comprises a body 51, a seal 54 movable axially relative to the body, and a pneumatic or hydraulic control system 8 for the seal. The valve 5 is said to be "axial" because the seal 54 moves in axial translation relative to the body 51.

In the illustrated example, the insertion direction D2 is parallel to the axial direction D1 of the valve 5.

The valve 5 comprises two end surfaces A, B, opposed in the insertion direction D2, and an outer side surface Se extending axially between the two end surfaces and substantially parallel to the insertion direction D2.

The body 51 for example has a cylindrical shape.

The system 8 defines a supply orifice 80 in the body 51.

The end surfaces A, B are advantageously planar and perpendicular to the insertion direction D2.

The module 4 is movable relative to the chassis 2 between an open position (FIG. 1), allowing the insertion of the valve 5 in the housing 9, and a closed position (FIG. 2), in which the module is fastened on the chassis 2. The module 4 for example forms an end piece suitable for being fastened on the reservoir or downstream pipe 102. The module 4 is for example articulated on the chassis 2 by a hinge (not shown).

According to one alternative (not shown), the module 4 is not fastened on the reservoir or downstream pipe 102, but is located inside the latter.

According to another alternative (not shown), the module 4 is fastened indirectly (i.e., via one or several intermediate parts) to the reservoir or downstream pipe 102.

The downstream passage 110 is fluidly connected to the central passage 106 when the module 4 is in the closed position. The downstream passage 110 is also fluidly connected to the reservoir or downstream pipe 102 when the equipment 1 is in use.

The chassis 2 advantageously has a handle shape allowing an operator (not shown) to manipulate the equipment 1 for example to connect it to the fluid source 104 and to the reservoir or downstream pipe 102.

The upstream passage 108 emerges in the bottom of the housing 9 and fluidly communicates with the central passage 106 when the valve 5 is in the inserted position.

The sealing gasket 61 and the additional sealing gasket 60 respectively form drawstrings closed around the axial direction D1 and are for example circular and arranged concentrically on the end face A located on the side of the bottom of the housing 9. The sealing gasket 61 and the additional sealing gasket 60 are compressed substantially in the insertion direction D2 between the valve 5 and the chassis 2, when the valve is in the inserted position and the module 4 is in the closed position (FIG. 2). In other words, the chassis 2 forms, at the bottom of the housing 9, a stop for the end face A of the valve 5, the gaskets 60, 61 being interposed.

The sealing gasket 7 is for example structurally similar to the sealing gasket 61, but is arranged on the end face B of the valve 5. The sealing gasket 7 is compressed substantially in the insertion direction D2 between the valve 5 and the module 4 when the valve 5 is in the inserted position and the module 4 is in the closed position.

When the module 4 is in the closed position, it exerts mechanical pressure in the insertion direction D2 toward the valve 5, which is passed on to the gaskets 7, 60, 61.

The sealing gaskets 61, 7 provide the sealing of the fluid connection between the central passage 106 and, respectively, the upstream passage 108 and the downstream passage 110.

The sealing gasket 61 and the additional sealing gasket 60 are suitable for providing sealed contact of the supply orifice 80 with the chassis 2, the sealed contact being intended to allow an intake of fluid, for example compressed air, in the system 8.

The outer lateral surface Se of the body 51 molds an inner surface Si of the chassis 2 delimiting the housing 9 when the valve 5 is in the inserted position.

The inner surface Si is for example substantially cylindrical. The inner surface Si covers the entire outer lateral surface Se, the outer lateral surface Se sliding freely on the inner surface Si in the insertion direction D2 when the valve 5 goes from the non-inserted position to the inserted position.

The chassis 2 advantageously comprises a handle 3 incorporating fluid connections 31 coming from a sheath 33 connected to the fluid source 104. The connections 31 in particular comprise supply hoses of the system 8 (not shown), and hoses conveying fluids to be transferred into the fluid circuits of the vehicles.

The chassis 2 for example comprises a removable part 21 attached to the handle 3. The chassis 2 and the part 21 can form a single and same part, like in the illustrated example.

The housing 9 is not a through housing. This feature can be obtained by combining the chassis 2 with the part 21, or directly through a single-piece chassis 2.

The valve 5 is inserted into the housing 9 and its outer lateral surface Se slides on the longitudinal inner surface Si.

According to alternatives that are not shown, the number of housings similar to the housing 9 is determined by the size of the chassis 2, the size of the valves 5 and the number of connections 31 requiring the use of valves respectively dedicated to a fluid and similar to the valve 5.

The module 4 is for example a module for attaching on the reservoir or downstream pipe 102. The module 4 comprises at least one fluid connection 32 intended to be connected to the valve 5. The handle 3 comprises control commands (not shown) intended to control the equipment 1, in particular the attachment on the reservoir or downstream pipe 102, the opening or closing of the valve 5, and the initiation of a filling sequence.

The valve 5 is closed by a cover 52. The valve 5 bears, on its end face A, the sealing gaskets 60 and 61, and on its end face B, at least the sealing gasket 7. The gaskets 60, 61 and 7 guarantee the sealing of the valve 5 in terms of the filling fluid and the fluid supplying the system 8 for actuating the seal 54.

The system 8 includes a tunnel 81 and a compression chamber 82. In this example embodiment of the invention, the orifice 80 is radially located between the additional sealing gasket 60 and the sealing gasket 61, which guarantees the sealing of the control circuit with respect to the outside and the filling fluid. The hydraulic or pneumatic control is provided by a compressed gas, such as air, or by a liquid.

A non-limiting example of the valve 5 is outlined in FIG. 2. In this example, a valve seat 53 is connected to or part of the cover 52.

The seal 54 becomes placed on the valve seat 53 to close the valve 5. The seal 54 acts as a sliding piston in the body 51. The seal 54 is pushed back toward the valve seat 53 by a spring 55. This spring 55 is compressed when compressed gas is sent into the compression chamber 82 of the system 8 through the tunnel 81. This contribution of compressed gas moves the seal 54 axially away from the seat 53, and compresses the spring 55. The valve 5 is then open.

Inner gaskets 56 guarantee the sealing between the different parts of the valve 5.

The spring 55 is preferably placed on the upstream side of the compression chamber 82 in the axial direction D1, or alternatively on the downstream side.

According to alternatives that are not shown, the spring 55 is replaced by another system accumulating tension, or by a second pneumatic control system.

The gaskets 60, 61 and 7 are arranged on the end faces A and B of the valve 5. Advantageously, the two gaskets 60 and 61 allow hermetic separation of the flow of fluid traversing the valve 5 from the outside, as well as separation of the fluid from the system 8. The gaskets 60, 61 and 7 not being located on the outer lateral surface Se of the valve 5, the valve 5 is inserted into the housing 9 without force or without tools. Orienting the equipment 1 such that the housing 9 opens downward makes it possible to remove the valve 5 from the housing 9 through the effect of gravity.

In FIG. 2, the illustrated valve 5 has a smooth outer lateral surface Se. However, according to another embodiment of the invention (not shown), the valve 5 has a fastening mechanism (not shown), advantageously by quarter revolution or by screwing in the housing 9. The housing 9 is then suitable for cooperating with the chosen fastening mechanism. In this embodiment, the locking of the valve 5 in the housing 9 puts pressure on the gaskets 60 and 61 in the bottom of the housing 9. Once this mechanism is unlocked, the valve 5 freely leaves the housing 9 through a simple downward orientation, not being braked by the presence of sealing gaskets on its outer lateral surface Se.

In another embodiment, the valve 5 is mounted differently. For example, the valve seat 53 is part of the body 51 and the cover 52 closes the end surface A of the valve 5, in contrast to the configuration illustrated in FIG. 2.

According to specific embodiments (not shown) of the invention, the orifice 80 of the system 8 is arranged on the end surface B of the valve 5, or on its outer lateral surface Se. The sealing is still provided by the gaskets 7 and 60 and/or 61. According to one particular embodiment (shown in mixed lines in FIG. 2), the gasket 60 and the gasket 7 are both arranged on the end face B and provide sealed contact of the orifice 80 with the module 4, the orifice being arranged on the end face B between these gaskets.

The cylindrical enclosure 51 and the cover 52 are advantageously crimped or screwed in one another to avoid a dislocation of the valve 5 during its withdrawal from the housing 9.

The equipment 1 makes it possible to use valves 5 having the characteristics previously described. The equipment 1 facilitates the placement and replacement of the valves 5 by operators. In an initial phase, the operator inserts the valve 5 until it abuts with the bottom of its housing 9. The gaskets 60 and 61 come into contact with the bottom of the housing 9 at the fluid connection 31. The operator fastens the module 4 on the chassis 2, thus closing the valve 5 inside the equipment 1.

The gasket 7 comes into contact with the module 4 at the fluid connection 32. By fastening the module 4 on the chassis 2, a mechanical pressure is exerted on both ends of the valve 5 in the insertion direction D2 and compresses the gaskets 60, 61 and 7, which provides sealing of the valve 5 in the equipment 1. The equipment 1 is ready to be used by the operator.

Via control commands present on the equipment 1, the operator actuates the raising of the seal 54 by injecting fluid into the system 8, which opens the valve 5. When it is open, the valve 5 provides fluid continuity by connecting the fluid connections 31 and 32 to one another, i.e., the upstream passage 108 and the downstream passage 110.

To change the valve 5, the operator places the module 4 in the open position, thus releasing the mechanical pressure on the gaskets 60, 61 and 7. Without stress on the end surfaces A, B or on its lateral end surface Se, the valve 5 simply leaves the housing 9 once the equipment 1 is switched to direct the opening of the housing 9 downward.

Owing to the features described above, the equipment 1 simplifies the removal of the valve 5 from the chassis 2 and guarantees easy replacement by the operator, while maintaining the functionalities and performance levels of the filling equipment of the prior art.

The invention claimed is:

1. Equipment for transferring fluid into a reservoir or a downstream pipe, the equipment comprising:
   at least one coaxial valve defining a central passage for the fluid in an axial direction (D1), the valve having a body,
   a chassis defining, on the one hand, at least one housing for receiving the valve, and, on the other hand, an upstream passage for the fluid, the upstream passage emerging in the housing and being intended to be fluidly connected to a fluid source, the valve being movable relative to the chassis, in an insertion direction (D2) between a non-inserted position in which the valve is located outside the housing, and an inserted position in which the valve is located at least partially in the housing,
   a module defining a downstream passage for the fluid, the downstream passage being intended to be fluidly connected to the reservoir or downstream pipe, the module being movable relative to the chassis between an open position, allowing the insertion of the valve in the housing, and a closed position in which the module is fastened on the chassis, and
   at least two sealing gaskets respectively forming drawstrings closed around the axial direction (D1) and being respectively compressed in the insertion direction (D2) between the valve and the chassis, and between the valve and the module when the valve is in the inserted position and the module is in the closed position.

2. The equipment according to claim 1, wherein the valve has a seal axially movable relative to the body, and a pneumatic or hydraulic control system for the seal, the system including a supply orifice defined by the body or by a cover of the valve, and wherein the equipment comprises at least one additional sealing gasket separate from said two sealing gaskets, the additional sealing gasket forming a drawstring closed around the axial direction (D1) and being compressed in the insertion direction (D2) either between the valve and the chassis, or between the valve and the module, when the valve in the inserted position and the module is in the closed position, the additional sealing gasket and one of the two sealing gaskets being suitable for providing sealed contact of the supply orifice with the chassis or with the module, the sealed contact being intended to allow fluid to be taken into the system.

3. The equipment according to claim 1, wherein the valve comprises two opposite end surfaces (A, B) in the insertion direction (D2), and an outer lateral surface (Se) extending axially between the two end surfaces (A, B) and parallel to the insertion direction (D2), the lateral end surface (Se) molding an inner surface (Si) of the chassis when the valve is in the inserted position, and the lateral end surface (Se) sliding freely on the inner surface (Si) in the insertion direction (D2) when the valve goes from the non-inserted position to the inserted position.

4. The equipment according to claim 3, wherein the two end surfaces (A, B) are planar.

5. The equipment according to claim 4, wherein the two end surfaces are perpendicular to the insertion direction.

6. The equipment according to claim 3, wherein the valve and the housing are cylindrical.

7. The equipment according to claim 3, wherein the inner surface of the chassis covers the entire lateral end surface.

8. The equipment according to claim 1, wherein the chassis comprises a removable part, one of the two sealing gaskets being compressed in the insertion direction (D2) between the removable part and the valve when the valve is in the inserted position and the module is in the closed position.

9. The equipment according to claim 1, wherein the axial direction (D1) and the insertion direction (D2) are parallel to one another.

10. An assembly comprising at least one reservoir or downstream pipe, at least one fluid source, and at least one piece of equipment according to claim 1, the upstream passage formed by the chassis being fluidly connected to the fluid source, and the downstream passage formed by the module being fluidly connected to the reservoir or downstream pipe.

11. The equipment according to claim 1, wherein the valve is movable in translation relative to the chassis.

12. A method for transferring a fluid into a reservoir or into a downstream pipe, comprising the following steps:
   providing a coaxial valve defining a central passage for the fluid in an axial direction (D1), the valve having a body,
   providing a chassis defining, on the one hand, at least one housing for receiving at least the valve, and, on the other hand, an upstream passage for the fluid, the upstream passage emerging in the housing, the valve being movable relative to the chassis, in an insertion direction (D2) between a non-inserted position in which the valve is located outside the housing, and an inserted position in which the valve is located at least partially in the housing, fluidly connecting the upstream passage to a fluid source, providing a module defining a downstream passage for the fluid, the module being movable relative to the chassis between an open position, allowing the insertion of the valve in the housing, and a closed position in which the module is fastened on the chassis, fluidly connecting the downstream passage to the reservoir or downstream pipe, providing at least two sealing gaskets respectively forming drawstrings closed around the axial direction (D1), and mechanically compressing the two sealing gaskets in the insertion direction (D2) respectively between the valve and the chassis and between the valve and the module, the valve being in the inserted position and the module being in the closed position.

13. The method according to claim 12, wherein the valve is movable in translation relative to the chassis in the insertion direction.

* * * * *